(12) United States Patent
Li

(10) Patent No.: US 9,783,076 B2
(45) Date of Patent: Oct. 10, 2017

(54) ELECTRIC VEHICLE

(71) Applicants: ZHEJIANG GEELY HOLDING GROUP CO., LTD, Hangzhou (CN); Zhejiang Geely Automobile Research Institute Co., LTD, Taizhou (CN)

(72) Inventor: Shufu Li, Hangzhou (CN)

(73) Assignees: Zhejiang Geely Holding Group Co., Ltd, Hangzhou (CN); Zhejiang Geely Automobile Research Institute Co., Ltd, Taizhou (CN)

( * ) Notice: Subject to any disclaimer, the term of this patent is extended or adjusted under 35 U.S.C. 154(b) by 0 days.

(21) Appl. No.: 15/512,477

(22) PCT Filed: Sep. 8, 2015

(86) PCT No.: PCT/CN2015/089136
§ 371 (c)(1),
(2) Date: Mar. 17, 2017

(87) PCT Pub. No.: WO2016/041451
PCT Pub. Date: Mar. 24, 2016

(65) Prior Publication Data
US 2017/0232859 A1     Aug. 17, 2017

(30) Foreign Application Priority Data

Sep. 18, 2014   (CN) .......................... 2014 1 0477734

(51) Int. Cl.
*B60L 11/18* (2006.01)
*B60K 1/04* (2006.01)
(Continued)

(52) U.S. Cl.
CPC ............ *B60L 11/1822* (2013.01); *B60K 1/04* (2013.01); *B60S 5/06* (2013.01); *B66F 3/02* (2013.01); *B60K 2001/0494* (2013.01)

(58) Field of Classification Search
CPC .................. B60L 11/1822; B60K 1/04; B60K 2001/0494
See application file for complete search history.

(56) References Cited

U.S. PATENT DOCUMENTS 3,259,365 A * 7/1966 Gibson .................... B60K 1/04
 104/34
4,055,260 A * 10/1977 Tamas ...................... B60K 1/04
 104/34

(Continued)

FOREIGN PATENT DOCUMENTS

CN          2771018        4/2006
CN         201117695       9/2008
(Continued)

OTHER PUBLICATIONS

International Search Report and Written Opinion for corresponding International Application No. PCT/CN2015/089136, dated Nov. 10, 2015.

(Continued)

*Primary Examiner* — Kaitlin Joerger
(74) *Attorney, Agent, or Firm* — Alston & Bird LLP

(57) ABSTRACT

An electric vehicle (10) includes a power battery module (20) detachably installed at a predetermined installation position of the electric vehicle (10); the power battery module (20) includes a housing (21), a plurality of battery cells installed in the housing (21), rolling wheels (22) and a handle (23) installed on the housing, and an electric power output port. A lifting device capable of releasably holding the power battery module (20) and lifting the power battery module (20) from a ground proximity position on or near the ground to the predetermined installation position is installed at the electric vehicle. As the electric vehicle (10) is provided with the lifting device, installation and removal of the power battery thereof can be accomplished without using (Continued)

other installation equipment. Furthermore, the detachable power battery module (20) can be moved by a user without excessive effort.

14 Claims, 6 Drawing Sheets

(51) Int. Cl.
  *B60S 5/06* (2006.01)
  *B66F 3/02* (2006.01)

(56) References Cited

U.S. PATENT DOCUMENTS

| | | | |
|---|---|---|---|
| 8,146,694 B2 * | 4/2012 | Hamidi | B60K 1/04 |
| | | | 180/68.5 |
| 8,167,069 B2 * | 5/2012 | Boegelein | B60L 11/1822 |
| | | | 180/68.5 |
| 8,191,688 B2 * | 6/2012 | Bogelein | B60K 1/04 |
| | | | 180/68.5 |
| 8,347,995 B2 * | 1/2013 | Fernandez-Mateo | B60K 1/04 |
| | | | 180/65.22 |
| 9,227,601 B2 * | 1/2016 | Corfitsen | B60L 11/1822 |
| 9,312,523 B2 * | 4/2016 | Choi | H01M 2/1016 |
| 9,352,728 B2 * | 5/2016 | Corfitsen | B60L 11/1822 |
| 9,573,453 B2 * | 2/2017 | Ojima | B60K 1/04 |
| 2008/0006459 A1 * | 1/2008 | Niebuhr | B60K 1/04 |
| | | | 180/68.5 |
| 2009/0058355 A1 * | 3/2009 | Meyer | B60L 11/1822 |
| | | | 320/104 |
| 2012/0037437 A1 | 2/2012 | Fernandez-Mateo | |
| 2015/0311487 A1 * | 10/2015 | Choi | H01M 2/00 |
| | | | 429/98 |
| 2016/0185243 A1 * | 6/2016 | Zhou | B60L 11/1822 |
| | | | 180/68.5 |

FOREIGN PATENT DOCUMENTS

| | | |
|---|---|---|
| CN | 101992754 | 3/2011 |
| CN | 102152777 | 8/2011 |
| CN | 102267439 | 12/2011 |
| CN | 102300734 | 12/2011 |
| CN | 203237020 | 10/2013 |
| CN | 203766721 | 8/2014 |
| CN | 104385892 | 3/2015 |
| DE | 102012107604 | 2/2014 |
| EP | 1935731 | 6/2008 |
| FR | 2989522 | 10/2013 |

OTHER PUBLICATIONS

Office Action for corresponding Chinese Application No. 201410477734.9 dated Jun. 17, 2016.

* cited by examiner

ELECTRIC VEHICLE

FIELD OF THE INVENTION

The present invention relates to the field of electric vehicles, and in particular to an electric vehicle in which a power battery can be conveniently detached.

BACKGROUND OF THE INVENTION

In the prior art, the weight of power supply batteries of an electric vehicles is large, so undetachable fixed installation structures are often adopted for the batteries, resulting in that the electric vehicle has to be involved entirely during charging or maintaining operations.

In view of this, batteries of some electric vehicles are configured with detachable installation structures at present so as to detach the batteries and move them separately if necessary. However, as to such detachments, the batteries are generally detached and installed via special equipment, which not only leads to a complex battery detachment and removal process, but also increases the cost of use, thereby being not conducive to personal operations of users.

SUMMARY OF THE INVENTION

One object of the present invention is to provide an electric vehicle in which a person can conveniently detach and move a battery by himself.

A further object of the present invention is to reduce the installation difficulty during reinstallation of a battery after detachment from the electric vehicle.

Another object of the present invention is to provide an electric vehicle in which the battery detached from the electric vehicle can be used as a transportation tool.

Particularly, the present invention provides an electric vehicle, including: a power battery module detachably installed at a predetermined installation position of the electric vehicle, including:

a housing;

a plurality of battery cells arranged in the housing and connected with one another in a predetermined serial and/or parallel mode so as to output electric driving power required for the electric vehicle;

rolling wheels and a handle, installed at the housing and arranged to facilitate a user dragging the power battery module on the ground in a state that the power battery module has been detached from the electric vehicle; and an electric power output port connected with an electric power input port of the electric vehicle to provide the electric driving power to the electric vehicle; and a lifting device installed at and carried by the electric vehicle, and configured to releasably hold the power battery module and lift the power battery module from a ground proximity position on or near the ground to the predetermined installation position, wherein the height of the ground proximity position is low enough for the user to push the power battery module to the ground proximity position via the rolling wheels without lifting the power battery module by manpower.

Further, the lifting device is configured to be driven by an electric driving source.

Further, the power battery module further includes a flexible cable, and the length of the flexible cable is configured to be sufficient to electrically connect the electric power output port of the power battery module to the electric power input port of the vehicle when the power battery module is at the ground proximity position.

Further, the lifting device includes a holder used for receiving and holding the power battery module, wherein the electric power input port of the electric vehicle includes a receiving-end electric contact element formed at the holder; the electric power output port of the power battery module includes an output-end electric contact element formed at the housing; and when the power battery module is moved into the ground proximity position, the power battery module is received and held by the holder, and the receiving-end electric contact element comes into electric contact with the output-end electric contact element.

Further, the lifting device is further configured to be driven by manpower.

Further, the lifting device includes a switching element capable of being manipulated manually to move between an electric driving position and a manpower driving position, wherein when the switching element is at the electric driving position, the lifting device is connected with the electric driving source; and when the switching element is at the manpower driving position, the lifting device is disconnected with the electric driving source to allow the lifting device to be driven by manpower.

Further, the predetermined installation position is in a lower part or outside of the tail of the electric vehicle.

Further, the power battery module further includes a charge and discharge control circuit used for controlling the charge and/or discharge of the power battery module.

Further, the power battery module further includes an adjusting circuit used for adjusting the voltage and/or current output from the electric power output port.

Further, the power battery module further includes a manual adjusting element arranged at the housing, wherein the adjusting circuit carries out the adjustment according to the user's operation of the manual adjusting element.

Further, the electric power output port of the power battery module includes a plurality of sub-ports. The plurality of sub-ports output voltages and/or currents different from one another; and/or, the plurality of sub-ports have interface types different from one another.

Further, the electric quantity of the power battery module is not lower than 6 KW·h, and/or, the weight of the power battery module is not higher than 50 Kg.

Further, a driving motor is arranged at the power battery module, the driving motor can drive the rolling wheels to rotate, and a switch for controlling the rotating speed of the driving motor is arranged at the handle.

Further, a foot pedal for the standing of the user is arranged at the power battery module, so that the user can stand on the power battery module and drive the power battery module to travel.

As the electric vehicle of the present invention is provided with the lifting device, installation and removal of the power battery thereof can be accomplished without using other installation equipment. Furthermore, the detachable power battery module can be moved by a user without excessive effort.

Further, as the driving motor is installed at the power battery module of the present invention, the power battery module can realize self-movement and can be used as a transportation tool.

In addition, after the electric power of the power battery module of the electric vehicle of the present invention is used up or after a failure occurs and cannot be handled on the spot, it can be replaced by a power battery module with the same model number which may be provided and delivered by a specialized service organization, thereby improving the viability of the electric vehicle.

The aforementioned and other objects, advantages and features of the present invention will be more apparent to those skilled in the art according to the following detailed description of specific embodiments of the present invention in combination with accompany drawings.

BRIEF DESCRIPTION OF THE DRAWINGS

Some specific embodiments of the present invention will be described in detail below in an exemplary rather than restrictive manner, with reference to the accompanying drawings. The same reference signs in the accompany drawings represent the same or similar components or parts. It should be understood by those skilled in the art that these accompany drawings are not necessarily to scale. In the accompany drawings.

DETAILED DESCRIPTION OF THE EMBODIMENTS

Figure 1:
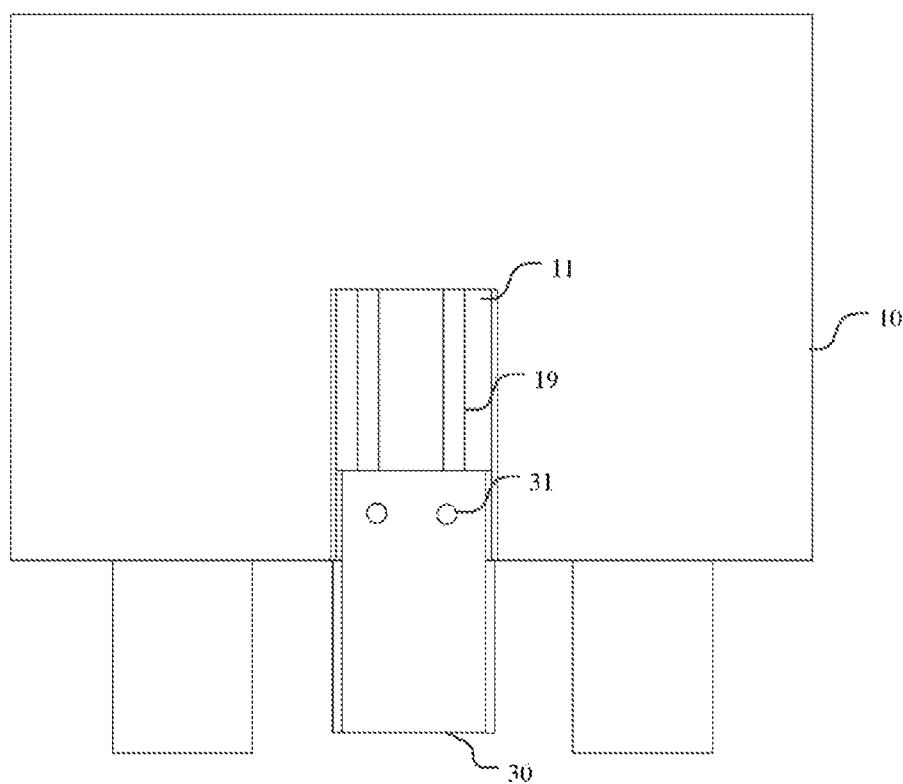
FIG. 1 is a structural schematic diagram of an electric vehicle according to an embodiment of the present invention, illustrating the electric vehicle seen from the tail of the vehicle and a lifting device thereof at a ground proximity position.
Figure 2:
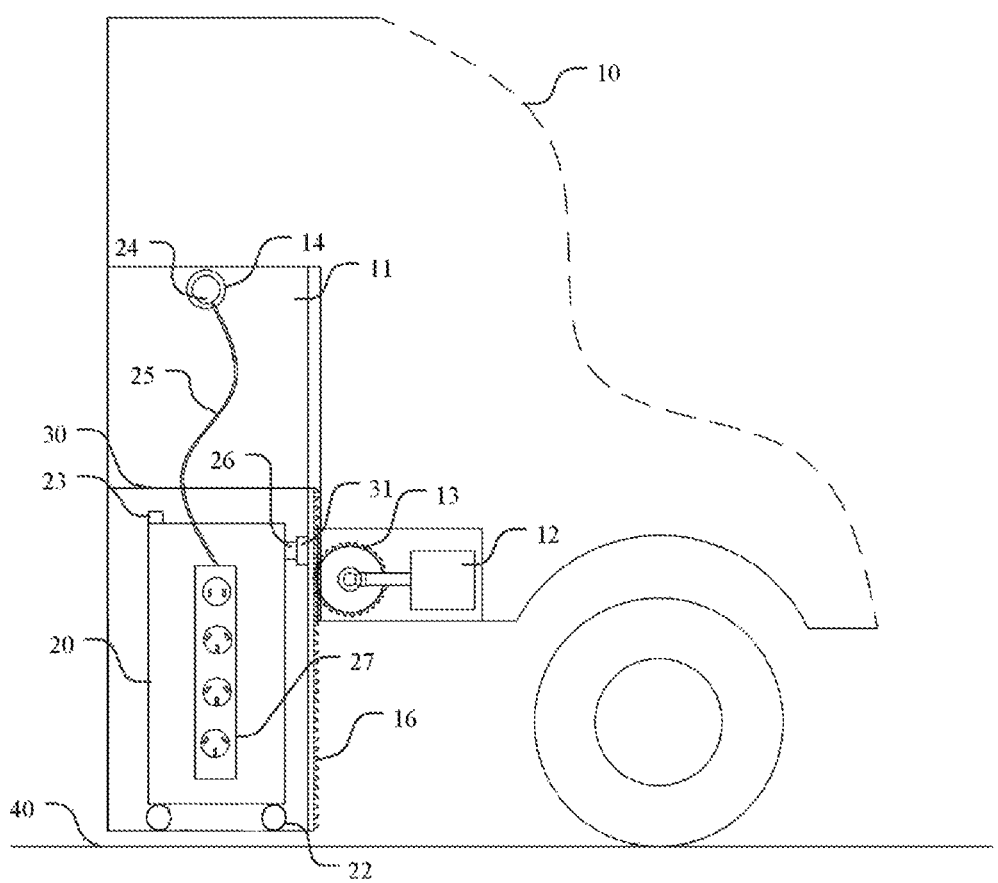
FIG. 2 is a side view of the electric vehicle as shown in FIG. 1, wherein only a part of the tail of the electric vehicle is shown, and a power battery module in the lifting device is shown in a partial sectional view.
Figure 3:
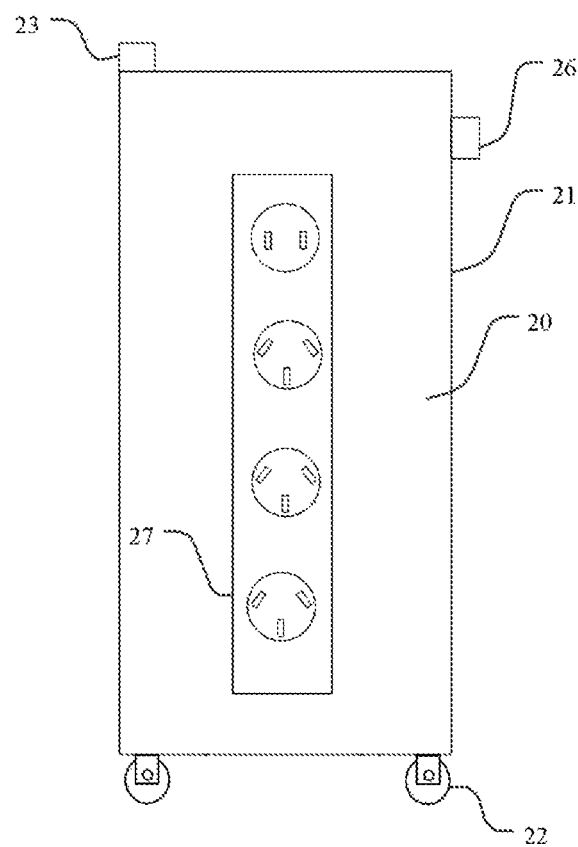
FIG. 3 is a structural schematic diagram of a power battery module according to an embodiment of the present invention.
Figure 6:
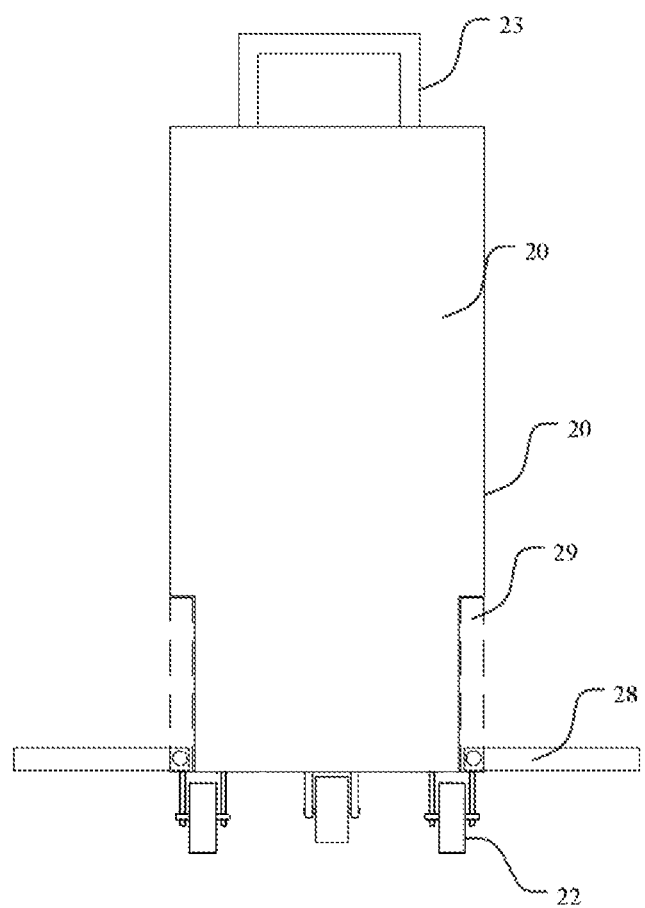
FIG. 6 is a structural schematic diagram of a power battery module provided with a foot pedal according to an embodiment of the present invention.

As shown in FIGS. 1, 2 and 3, the electric vehicle 10 of the present invention includes a power battery module 20 detachably installed into a predetermined installation position of the electric vehicle 10. The power battery module 20 may be seen more clearly in FIG. 3 and includes a housing 21 and a plurality of battery cells (not shown in the figures) installed in the housing 21. The battery cells are connected with one another in the housing 21 in a predetermined serial and/or parallel mode so as to output electric driving power required for the electric vehicle 10. Rolling wheels 22 and a handle 23 are further installed on the housing 21, the rolling wheels 22 and the handle 23 are arranged at positions where a user can conveniently drag the power battery module 20 on the ground in a state that the power battery module 20 has detached and separated from the electric vehicle 10. In this case, the power battery module 20 as a whole is formed into the form of a suitcase with rolling wheels. The rolling wheels may be arranged around the bottom of the power battery module, so that the power battery module can be smoothly moved in an inclined or vertical state. The handle 23 may be formed into the form of an extendable rod, so that the power battery module 20 as a whole is formed into the form of a trolley case. In this case, the handle 23 as shown in FIG. 3 is in a retracted state, the user may pull the handle outward to the position as shown in FIG. 6, so that the user may conveniently adjust the height of the handle 23, and thus being suitable for the user to conveniently drag the power battery module 20 via the handle 23 when walking upright.

An electric power output port is further formed in the power battery module 20, and the electric power output port is used for connection with an electric power input port of the electric vehicle 10 to provide electric driving power to the electric vehicle 10. As shown in FIG. 1, the electric power output port of the power battery module 20 may include an electric plug 24 formed at the end of a flexible cable 25, and correspondingly, the electric power input port of the electric vehicle 10 may include an electric socket 14 for mating connection with the electric plug 24. As can be seen hereinafter, additionally or alternatively, the power battery module 20 may also have other forms of electric output ports, such as an output-end electric contact element 26 and an electric socket set 27 as will be described hereinafter, so that the user provides electric power for the electric vehicle 10 or other electric equipment in appropriate occasions.

A lifting device serving as a part of the electric vehicle 10 is further installed at the electric vehicle 10, and is installed onto and carried by the electric vehicle 10. The lifting device is configured to releasably hold the power battery module 20 and lift the power battery module 20 from a ground proximity position on or near the ground to the required predetermined installation position. The ground proximity position refers to a position where the power battery module 20 is located when it is about to be lifted by the lifting device, and the height of the ground proximity position is low enough for the user to push the power battery module 20 to the ground proximity position via the rolling wheels 22 without lifting the power battery module 20 by manpower. An exemplary embodiment of the lifting device will be described hereinafter, and of course, the lifting device may also employ any suitable structure in the prior art.

The power battery module 20 in the present invention can be conveniently detached and installed by the user alone at the electric vehicle 10 and can be moved away from or toward the electric vehicle 10 without using other working platform or transportation tool. The lifting device installed at the electric vehicle 10 can conveniently detach the power battery module 20 from the electric vehicle 10 to a position in which it can be easily moved by the user, so that the carrying workload of the user is reduced. Similarly, when the user moves the power battery module 20 onto the lifting device, the user may also easily place the power battery module 20 onto the lifting device by pushing it, and then the lifting device lifts the power battery module 20 to the predetermined installation position of the electric vehicle 10, without having to directly lift or carry the power battery module 20 by manpower.

Further, the lifting device in the present invention may be configured to be driven by an electric driving source. The lifting device can achieve automatically loading and unloading of the power battery module 20 by the electric driving source. As shown in FIG. 2, the electric driving source can be a traction motor 12.

Further, as shown in FIG. 2, the flexible cable 25 extending out of the power battery module 20 may be arranged at the power battery module 20. The flexible cable 25 can transfer the electric power of the power battery module 20 to the electric plug 24 at the tail end thereof. The length of the flexible cable 25 can be configured to be sufficient to electrically connect the electric plug 24 of the power battery module 20 with the electric socket 14 of the electric vehicle 10 when the power battery module 20 is at the ground proximity position. When the power battery module 20 is to be installed onto the electric vehicle 10, the power battery module 20 may be moved to the to-be-lift ground proximity position, then the electric plug 24 is inserted into the electric socket 14 of the electric vehicle 10 via the flexible cable 25 to provide electric power for the electric vehicle 10, and then the electric vehicle 10 provides electric power for the electric driving source, such as the traction motor 12, so that the electric driving source can drive the lifting device. The flexible cable 25 allows the power battery module 20 to provide electric power for the electric vehicle 10 at the ground proximity position or at a further position before the power battery module is installed back onto the predetermined installation position of the electric vehicle 10. This is particularly advantageous when the power battery module 20 is the only power source of the electric vehicle 10. Otherwise, the lifting device cannot carry out a lifting operation under electric drive due to the lack of electric power supply.

Further referring to FIG. 2, the lifting device may include a holder 30, and the holder 30 is used for receiving and holding the power battery module 20. A receiving-end electric contact element 31 may be formed at the holder 30 and is used as the electric power input port of the electric vehicle 10. Correspondingly, an output-end electric contact element 26 may be formed at the housing 21 of the power battery module 20 and is used as the electric power output port of the power battery module 20. When the power battery module 20 is to be installed onto the electric vehicle 10, the lower end of the holder 30 of the lifting device is at a position close to the ground 40. In this case, the user directly pushes the power battery module 20 into the holder 30 via the rolling wheels 22, and the holder 30 receives and holds the power battery module 20, and there is no need to lift the power battery module 20 by manpower. At this time, the power battery module 20 is at the ground proximity position. During pushing the power battery module 20 into the ground proximity position, the output-end electric contact element 26 of the power battery module 20 gradually approaches the receiving-end electric contact element 31 of the holder 30 and finally comes into electric contact with it. During lifting the holder 30, the electric contact elements 26 and 31 maintain the electric contact therebetween all the time. Therefore, the electric power of the power battery module 20 can be provided to the electric vehicle 10 by the electric contact of the electric contact elements 26 and 31, so that the electric vehicle 10 can provide the electric power required for the lifting device. Similar to the electric connection using the flexible cable 25 as mentioned above, the present electric connection solution may also achieve that the power battery module 20 can provide the electric power to the electric vehicle 10 at the ground proximity position, which is particularly advantageous when the power battery module 20 is the only power source of the electric vehicle 10. It should be understood that although the electric connection solution of the electric plug 24 and the electric socket 14 and the electric connection solution of the electric contact elements 26 and 31 are both shown in FIG. 2, it can be understood that either of the electric connection solutions may be used alone in other embodiments.

Hereinafter, the case where the power battery module 20 is the only power source of the electric vehicle 10 will be further considered. After the lifting device lowers the power battery module 20 from the installation position to the ground proximity position and separates the power battery module 20 from the lifting device, it is possible that the power battery module 20 has already disconnected electrically from the electric vehicle 10 at this moment, and thus cannot provide electric power for the electric vehicle 10 to return the lifting device back to a retracted state before its descending. After the power battery module 20 is unloaded from the lifting device, in order to conveniently return the lifting device without the power battery module 20 back to its retracted state, the lifting device may also be configured to be a structure that can be driven manually. In this way, the lifting device after unloading the power battery module 20 may be manually retracted by the user into the electric vehicle 10 without the support of the electric power so as to the retracted state thereof. In addition, when the power battery module 20 is to be installed onto the electric vehicle 10, if the lifting device is still in the retracted state at this moment, the user may manually pull out the lifting device to a position suitable for receiving the power battery module 20. As the user manually operates the lifting device without the power battery module 20, such operation is easy and effortless.

Figure 4:
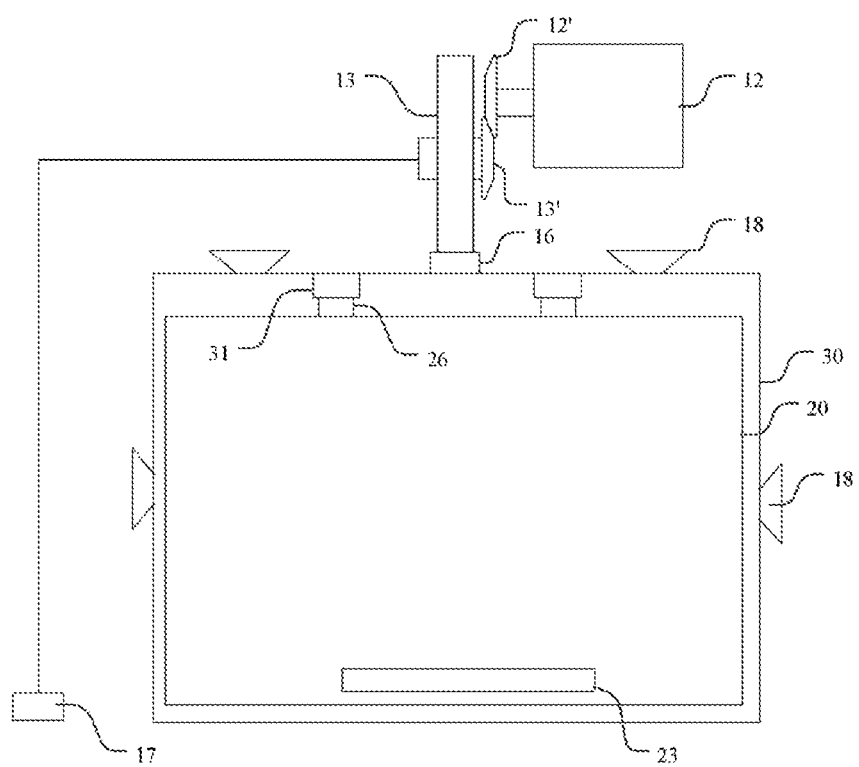
FIG. 4 is a structural schematic diagram of the power battery module as shown in FIG. 2 placed in the lifting device.

As shown in FIG. 4, the lifting device may include a switching element 17 that may be manually manipulated to move between an electric driving position and a manpower driving position. When the switching element 17 is at the electric driving position, the lifting device is connected with the electric driving source, such as the traction motor 12; and when the switching element 17 is at the manpower driving position, the lifting device is disconnected from the electric driving source, such as the traction motor 12 to allow the lifting device to be driven by manpower. Exemplarily, the switching element 17 may be an actuator, which can enable a transmission connection part between the lifting device and the electric driving source to be selectively in a separated or engaged state.

It also needs to be understood that in the case where the electric vehicle 10 has other power source, (e.g., additional storage battery), the other power source may provide electric power for the electric driving source, such as the traction motor 12, in order to drive the lifting device. In this case, the power battery module 20 is allowed not to electrically connect to the electric vehicle 10 when it is at the ground proximity position, and then is electrically connected with the electric vehicle 10 until the power battery module 20 is lifted to the predetermined installation position. At the predetermined installation position, the power battery module 20 and the electric vehicle 10 may similarly adopt the cable connection solution or the connection solution of the electric contact element pairs mentioned above. At this time, the lifting device may also be configured so as to have no need of being driven by manpower.

As shown in FIG. 1, in an embodiment of the present invention, a mounting groove 11 is the predetermined installation position of the power battery module 20, and the mounting groove 11 may be located in a lower part of the tail of the electric vehicle 10. In other embodiments, the predetermined installation position of the power battery module 20 may be located outside of the tail of the electric vehicle.

In an embodiment of the present invention, the power battery module 20 may further include a charge and discharge control circuit (not shown in the drawings) used for controlling the charge and/or discharge of the power battery module 20. With the charge and discharge control circuit, after the power battery module 20 leaves the electric vehicle 10, the electric power output port can be used as a power input receiving port to be connected with other charging equipment, thereby charging the power battery module.

Furthermore, the electric power of the power battery module may be provided to other electric equipment excluding the electric vehicle 10 via the electric power output port.

Further, the power battery module 20 may further include an adjusting circuit (not shown in the drawings), and the adjusting circuit is used for adjusting the voltage and/or current output by the power battery module 20 via the electric power output port. With the adjusting circuit, the power battery module 20 may also be used as the charging equipment or power supply equipment of other electric equipments. It can be understood that in other embodiments, the power battery module 20 may also be provided with a manual adjusting element. The adjusting circuit may carry out the adjustment according to the user's operation of the manual adjusting element so as to conveniently change the output voltage of the power battery module 20.

Further, in other embodiments, the power battery module 20 may be connected with a data signal line of the electric vehicle 10 by a corresponding interface in order to realize the data exchange between the electric vehicle 10 and the power battery module 20.

In an embodiment of the present invention, the electric power output port of the power battery module 20 may include a socket set 27. As shown in FIG. 2, the electric socket set 27 may include a plurality of sub-ports, and these sub-ports output voltages and/or currents different from one another and may have interface types different from one another. By means of the above-mentioned structure, different power supply modes and plugging modes for different plugs can be provided for different electric equipment after the power battery module 20 leaves the electric vehicle 10, and thus the application range of the power battery module 20 is expanded.

To provide enough electric power to the electric vehicle 10, the electric quantity of the power battery module 20 is preferably not lower than 6 KW·h. Furthermore, to facilitate movement of the power battery module and adapt to the lightweight electric vehicle 10, the weight of the power battery module 20 is preferably not higher than 50 Kg. In this case, in view of the energy density and the safety of the power battery module 20, the battery cells used therefor may be ternary non-polymer batteries, such as batteries doped with tin lithium titanium oxide in lithium ions or batteries doped with silver-titanium alloy. Such batteries are high in safety and unlikely to explode. The object of the embodiment is to enable the electric vehicle 10 to travel at least 60-80 km at a time in the case that the power battery module 20 thereof is fully charged. A general electric vehicle 10 with the existing power battery can travel 5-6 km per KW·h, and when the electric vehicle 10 adopts the lightweight technology, it can travel about 10 km. Therefore, the power battery module 20 requires at least 6 KW·h to meet the lightweight requirements on the weight of the power battery module while meeting the travelling requirements of the electric vehicle.

Figure 5:
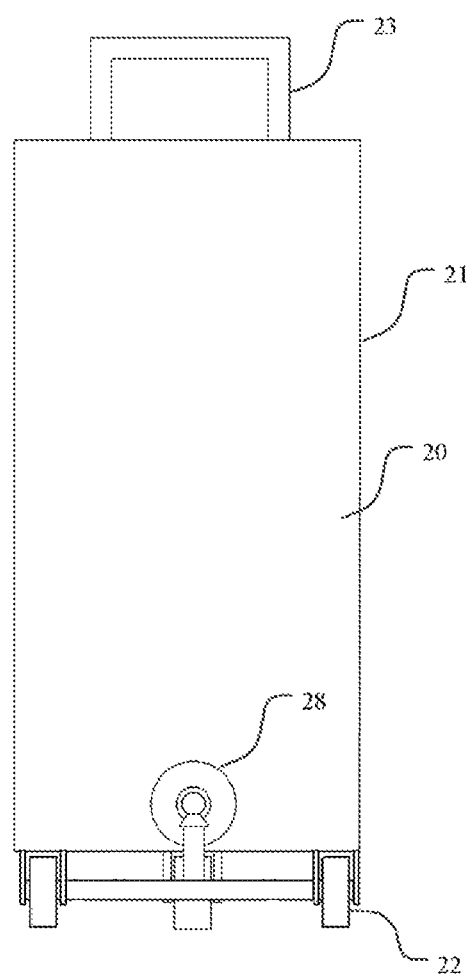
FIG. 5 is a structural schematic diagram of a power battery module provided with a driving motor according to an embodiment of the present invention.

As shown in FIG. 5, in an embodiment of the present invention, a driving motor 28 may be arranged on the power battery module 20, and the driving motor 28 may drive the rolling wheels 22 to rotate. A manipulation element (not shown and marked in the drawings) for controlling the operation of the driving motor 28 may be arranged at the handle 23, and the manipulation element may control, for example, the on and off of the driving motor 28 and the output rotating speed thereof. In use, the power battery module 20 detached from the lifting device can be controlled by the user to directly use the electric power in the power battery module 20 to drive the driving motor 28 to work so as to move the power battery module 20 on the ground, which relieves the burden of the user during the movement. Furthermore, since the driving motor 28 is adopted, the user can move the power battery module 20 having a larger weight. In FIG. 5, the rolling wheels 22 can be driven by the driving motor 28 to rotate and can also roll on the ground when the driving motor 28 does not work and the user pulls the power battery module 20. In other embodiments, the driven wheel driven by the driving motor 28 may be not the rolling wheel 22 but is additionally provided.

As shown in FIG. 6, in a further embodiment of the present invention, in the case that the power battery module 20 has the driving motor 28 (not shown in this figure), a foot pedal 28 for the user to stand on may be provided for the power battery module 20. In this case, when the user stands on the power battery module 20, the driving motor 28 can drive the rolling wheels 22 to rotate so as to drive the power battery module 20 to move and cause the user to travel at the same time. An accommodation groove 29 for accommodating the foot pedal 28 may be formed in the housing 21 of the power battery module 20, usually the foot pedal 28 may be rotatably placed into the accommodation groove 29, and the foot pedal 28 may be directly rotated to a horizontal state in order for use. In the solution, the detached power battery module 20 can become an independent standing electric vehicle to serve as a transportation tool of the user, and furthermore, it is convenient for the user to move the power battery module 20. In some places that the electric vehicle 10 cannot arrive at or cannot pass through, the power battery module 20 can also be used as a temporary vehicle.

An exemplary structure of the lifting device in the present invention will be described below in detail in combination with FIGS. 1, 2 and 4.

The mounting groove 11 for placing the power battery module 20 is formed in the middle of the tail of the electric vehicle 10, and the holder 30 is arranged in the mounting groove 11. The electric socket 14, a dovetail groove 19, a driving gear 13 and the traction motor 12 for driving the driving gear 13 to rotate are arranged on a side wall of the mounting groove 11. The holder 30 is provided with a wedge-shaped slide rail 18, which is matched with the shape of the dovetail groove 19 and arranged at a position corresponding to the dovetail groove 19. A gear rack 16 is arranged at a position corresponding to the driving gear 13. The receiving-end electric contact element 31 is further formed at the holder 30. The switching element 17 for controlling the driving gear 13 to disengage from and engage with the traction motor 12 is arranged at a proper position of the electric vehicle 10 outside the mounting groove 11.

The handle 23 and the rolling wheels 22 are arranged at the housing 21 of the power battery module 20, and the electric plug 24, the electric socket set 27 and the output-end electric contact element 26 are further provided serving as the electric power output ports.

In an assembly state, the slide rail 18 of the holder 30 is inserted into the dovetail groove 19 on the mounting groove 11, and thus the holder 30 is held vertically slidably held in the mounting groove 11. At this time, the driving gear 13 is engaged with the gear rack 16. The power battery module 20 is in the holder 30, and the output-end electric contact element 26 thereof is inserted into the receiving-end electric contact element 31 of the holder 30 to form an electric connection so as to enable the power battery module 20 to provide electric power for the electric vehicle 10. Certainly, optionally, the electric plug 24 at the tail end of the extensible flexible cable 25 may be used to establish electric connection with the electric socket 14 at the mounting groove 11.

To detach the power battery module 20 from the electric vehicle 10, the electric vehicle 10 drives the driving gear 13 to rotate via the traction motor 12, and the driving gear 13 drives the holder 30 to descend by the engagement transmission with the gear rack 16. When the holder 30 descends to a position close to or against the ground, the user may move the power battery module 20 via the handle 23 and pull out the power battery module from the holder 30 to the ground via the rolling wheels 22. At this time, as the power battery module 20 moves outward, the electric connection between the electric contact elements 26 and 31 is open. If the electric connection between the electric plug 24 and the electric socket 14 exists, the user may manually break the electric connection. Then, as shown in FIG. 4, the user may manipulate the switching element 17 so that a bevel gear 13' provided with the driving gear 13 is disengaged from a bevel gear 12' for transferring the power of the traction motor, thereby breaking the transmission connection with the traction motor 12. Then, the holder 30 is manually pushed upward until it is completely pushed back into the mounting groove 11. Then, the bevel gear 13' and the bevel gear 12' are controlled by the switching element 17 to be engaged with each other, such that the driving gear 13 is under the control of the traction motor 12 again, and the detachment of the power battery module 20 is thus completed.

To install the power battery module 20, the electric plug 24 of the power battery module 20 may be connected to the electric socket 14 of the mounting groove 11 firstly, so that the electric vehicle 10 can have electric power to drive the traction motor 12. The holder 30 is placed to the position close to or against the ground by the traction motor 12, and then the power battery module 20 is pushed into the holder 30. Then, under the drive of the traction motor 12, the holder 30 can completely enter the mounting groove 11, and the reinstallation of the power battery module 20 is thus completed.

In installation of the power battery module 20, the traction motor 12 may be separated from the driving gear 13 by the switching element 17 at first, and then the holder 30 is manually pulled to the position close to or against the ground. Then, the user pushes the power battery module 20 into the holder 30, and the output-end electric contact element 26 is inserted into the receiving-end electric contact element 31 in the holder 30 to provide electric power for the electric vehicle 10. Then, the user manipulates the switching element 17 to engage the driving gear 13 with the traction motor 12, and the traction motor 12 drives the holder 30 to return into the mounting groove 11.

A display device can be arranged on the housing of the power battery module of the present invention, and when the power battery module is installed into the mounting groove, the display device faces to the tail direction of the electric vehicle so as to be directly observed from the outside. If the mounting groove of the electric vehicle is provided with an outer protective case, it may be made of a transparent material to facilitate the observation of the display device from the outside. Specific display equipment can be an LED display screen, an LED lamp or a liquid crystal display screen or the like, and the display equipment can be used as a brake light, or is used for displaying some specific patterns, logos and so on. The display device can also be used as a lighting lamp when the power battery module is removed from the electric vehicle at night and towed away.

So far, it should be appreciated by those skilled in the art that although a plurality of exemplary embodiments of the present invention have been shown and described herein in detail, a lot of other variations or modifications satisfying the principle of the present invention can still be directly determined or deduced according to the contents disclosed by the present invention without departing from the spirit and scope of the present invention. Accordingly, the scope of the present invention should be understood and deemed as covering all such other variations or modifications.

The invention claimed is:

1. An electric vehicle, comprising:
a power battery module detachably installed at a predetermined installation position of the electric vehicle, comprising:
a housing;
a plurality of battery cells arranged in the housing and connected with one another in a predetermined serial and/or parallel mode so as to output electric driving power required for the electric vehicle;
rolling wheels and a handle, installed at the housing and arranged to facilitate a user dragging the power battery module on the ground in a state that the power battery module has been detached from the electric vehicle; and
one or more electric power output ports, wherein at least one electric power output port is used for connection with an electric power input port of the electric vehicle to provide the electric driving power to the electric vehicle; and
a lifting device installed at and carried by the electric vehicle, and configured to releasably hold the power battery module and lift the power battery module from a ground proximity position on or near the ground to the predetermined installation position, wherein the height of the ground proximity position is low enough for the user to push the power battery module to the ground proximity position via the rolling wheels without lifting the power battery module by manpower,
wherein the lifting device comprises a holder for receiving and holding the power battery module;
wherein the electric power input port of the electric vehicle comprises a receiving-end electric contact element formed at the holder; the electric power output port of the power battery module comprises an output-end electric contact element formed at the housing; and when the power battery module is moved into the ground proximity position, the power battery module is received and held by the holder, and the receiving-end electric contact element comes into electric contact with the output-end electric contact element.

2. The electric vehicle of claim 1, wherein the lifting device is configured to be driven by an electric driving source.

3. The electric vehicle of claim 2, wherein the power battery module further comprises a flexible cable, wherein the length of the flexible cable is configured to be sufficient to electrically connect one of the electric power output ports of the power battery module to the electric power input port of the vehicle when the power battery module is at the ground proximity position.

4. The electric vehicle of claim 2, wherein the lifting device is further configured to be driven by manpower.

5. The electric vehicle of claim 4, wherein the lifting device comprises a switching element capable of being manipulated manually to move between an electric driving position and a manpower driving position;

wherein when the switching element is at the electric driving position, the lifting device is connected with the electric driving source; and when the switching element is at the manpower driving position, the lifting device is disconnected with the electric driving source to allow the lifting device to be driven by manpower.

6. The electric vehicle of claim 1, wherein the predetermined installation position is in a lower part or outside of the tail of the electric vehicle.

7. The electric vehicle of claim 1, wherein the power battery module further comprises a charge and discharge control circuit used for controlling the charge and/or discharge of the power battery module.

8. The electric vehicle of claim 7, wherein the power battery module further comprises an adjusting circuit used for adjusting the voltage and/or current output from the electric power output port.

9. The electric vehicle of claim 8, wherein the power battery module further comprises a manual adjusting element arranged at the housing;

wherein the adjusting circuit carries out the adjustment according to the user's operation of the manual adjusting element.

10. The electric vehicle of claim 7, wherein the electric power output port of the power battery module comprises a plurality of sub-ports, and the plurality of sub-ports output voltages and/or currents different from one another; and/or, the plurality of sub-ports have interface types different from one another.

11. The electric vehicle of claim 1, wherein the electric quantity of the power battery module is not lower than 6 KW·h, and/or, the weight of the power battery module is not higher than 50 Kg.

12. The electric vehicle of claim 11, wherein a driving motor and driven wheels driven by the driving motor to rotate are arranged at the power battery module, and a manipulation element for controlling the operation of the driving motor is arranged at the handle.

13. The electric vehicle of claim 12, wherein a foot pedal for the user to stand on is arranged at the power battery module, so that the user can stand on the power battery module and drive the power battery module.

14. The electric vehicle of claim 12, wherein the driven wheels are the rolling wheels.

* * * * *